(12) United States Patent
Pastrnak et al.

(10) Patent No.: US 8,542,983 B2
(45) Date of Patent: Sep. 24, 2013

(54) METHOD AND APPARATUS FOR GENERATING A SUMMARY OF AN AUDIO/VISUAL DATA STREAM

(75) Inventors: Milan Pastrnak, Malacky (SK); Pedro Fonseca, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 160 days.

(21) Appl. No.: 12/994,164

(22) PCT Filed: Jun. 2, 2009

(86) PCT No.: PCT/IB2009/052318
§ 371 (c)(1), (2), (4) Date: Nov. 23, 2010

(87) PCT Pub. No.: WO2009/150567
PCT Pub. Date: Dec. 17, 2009

(65) Prior Publication Data
US 2011/0075993 A1     Mar. 31, 2011

(30) Foreign Application Priority Data
Jun. 9, 2008    (EP) .................................... 08157834

(51) Int. Cl.
*H04N 5/93*     (2006.01)
(52) U.S. Cl.
USPC ........... 386/285; 386/281; 386/270; 386/304; 386/307; 704/205; 704/208; 704/210; 704/248
(58) Field of Classification Search
USPC ......... 386/285, 281, 270, 304, 307; 704/205, 704/208, 210, 248
See application file for complete search history.

(56) References Cited

U.S. PATENT DOCUMENTS

| 5,717,818 | A | * | 2/1998 | Nejime et al. | 704/211 |
|---|---|---|---|---|---|
| 6,317,711 | B1 | * | 11/2001 | Muroi | 704/253 |
| 6,453,291 | B1 | * | 9/2002 | Ashley | 704/233 |
| 6,480,823 | B1 | * | 11/2002 | Zhao et al. | 704/226 |

(Continued)

FOREIGN PATENT DOCUMENTS

| EP | 1722371 A1 | 11/2006 |
|---|---|---|
| EP | 1954041 A1 | 8/2008 |
| WO | 2007039994 A1 | 4/2007 |

OTHER PUBLICATIONS

Wan et al: "Automatic Sports Content Analysis-State-Of-Art and Recent Results"; Institute for INFOCOMM Research, Singapore, 7 Pageg Document.

(Continued)

*Primary Examiner* — Helen Shibru

(57) ABSTRACT

A method of generating a summary of an audio/visual data stream is provided, the data stream comprising a plurality of consecutive frames having audio and visual properties. A plurality of shots of an audio/visual data stream are detected (step 204). A plurality of segments of the audio/visual data stream are determined (step 206), each segment comprising a plurality of the shots of the data stream having similar visual properties. A segment of the determined plurality of segments is selected (step 208). For each shot of said selected segment of said data stream, the audio in a plurality of consecutive frames which occur after the end of said shot is extracted (step 210). At least one of the shots is selected based on the extracted audio (step 212). A summary is generated to include the selected at least one of the shots (step 214).

12 Claims, 1 Drawing Sheet

(56) References Cited

U.S. PATENT DOCUMENTS

| | | | |
|---|---|---|---|
| 6,823,303 B1* | 11/2004 | Su et al. | 704/220 |
| 2004/0167767 A1 | 8/2004 | Xiong et al. | |
| 2006/0059120 A1 | 3/2006 | Xiong et al. | |
| 2006/0263062 A1* | 11/2006 | Takao | 386/96 |
| 2007/0186163 A1 | 8/2007 | Yeh et al. | |
| 2007/0292112 A1 | 12/2007 | Lee et al. | |
| 2008/0010064 A1* | 1/2008 | Takeuchi et al. | 704/229 |
| 2009/0086993 A1* | 4/2009 | Kawaguchi et al. | 381/92 |
| 2009/0125305 A1* | 5/2009 | Cho | 704/233 |
| 2009/0285551 A1* | 11/2009 | Berry | 386/95 |

OTHER PUBLICATIONS

Gros et al: "Automatic Video Structuring Based on HMMS and Audio Visual Integration"; IRISA-CNRS, IRISA-Universite De Rennes 1, Campus Univerisitaire De Beaulieu, France, 6 Page Document.

* cited by examiner

METHOD AND APPARATUS FOR GENERATING A SUMMARY OF AN AUDIO/VISUAL DATA STREAM

FIELD OF THE INVENTION

The present invention relates to a method and apparatus for generating a summary of an audio/visual data stream.

BACKGROUND TO THE INVENTION

Watching broadcast sport events has become increasingly popular, as reflected by the increasing number of sport channels. However, the vast amount of available content makes it impossible for a user to watch all of it.

One existing solution is to provide a user with a summary of the event which shows the main highlights. Existing summarization systems typically aim at choosing the best segments of a video sequence that fit a pre-defined time interval. For example, if the user asks for a summary of 5 minutes, the system then detects which are the best segments that fit that summary of 5 minutes.

A very popularly watched sport is tennis and even though there are usually no more than three or four tournaments broadcasted at the same time, the amount of matches (especially during the initial rounds of the competitions) is high enough to prevent users from watching all of the matches. Moreover, the structure of tennis, which corresponds to an alternating sequence of rallies and breaks are quite often filled with commercials. As a result, it is desirable for the user to be able to watch the highlights as opposed to the complete match, in particular, to watch those rallies that are interesting, spectacular or important for the end result.

US 2007/0292112 discloses a method of searching a highlight in a film of a tennis game. A plurality of long-field view shots are detected in the film and the audio energy of the long-field view shots is used to determine desired long-field view shots belonging to the highlights. For example, the audio energy is used to identify applause during the long-field view shots to determine the highlights.

However, from the method of US 2007/0292112, it is not possible to determine the most important (for example, the most interesting) highlights. Further, the audio energy used to identify applause is not particularly accurate as it is likely to include unwanted noise such as the commentator's voice-over or sounds made by the players such as screams, ball hits, etc.

SUMMARY OF INVENTION

The present invention seeks to provide a method whereby a summary that includes the most important highlights of an audio/visual data stream is generated. The present invention further seeks to improve the accuracy of detecting the most important highlights.

This is achieved, according to an aspect of the invention, by a method of generating a summary of an audio/visual data stream, the data stream comprising a plurality of consecutive frames having audio and visual properties, the method comprising the steps of: detecting a plurality of shots of an audio/visual data stream; determining a plurality of segments of the audio/visual data stream, each segment comprising a plurality of the shots of the data stream having similar visual properties; selecting a segment of the determined plurality of segments; for each shot of the selected segment of the data stream, extracting the audio in a plurality of consecutive frames which occur after the end of the shot; selecting at least one of the shots based on the extracted audio; and generating a summary to include the selected at least one of the shots.

This is also achieved, according to another aspect of the invention, by an apparatus for generating a summary of an audio/visual data stream, the data stream comprising a plurality of consecutive frames having audio and visual properties, the apparatus comprising: a shot detector for detecting a plurality of shots of an audio/visual data stream; a determining means for determining a plurality of segments of the audio/visual data stream, each segment comprising a plurality of the shots of the data stream having similar visual properties; a first selector for selecting a segment of the determined plurality of segments; an extractor for extracting, for each shot of the selected segment of the data stream, the audio in a plurality of consecutive frames which occur after the end of the shot; a second selector for selecting at least one of the shots based on the extracted audio; and a summary generator for generating a summary to include the selected at least one of the shots.

In this way, the user's experience of watching a summary (for example, highlights such as tennis highlights) is enriched since the interesting shots are identified and separated from the original audio/visual data stream thus forming the summary. Advantageously, the summary will depend on how interesting each shot in the data stream is. Further, the criteria of "how interesting" a shot is can be adapted. The application can lower or raise the threshold in order to get correspondingly smaller or larger summaries. This control can be offered in a very simple way to the user. As a result of this control, the summary that is generated includes the most important (e.g. the most interesting) highlights of the audio/visual data stream. The detected events are therefore combined and presented in a summary of a more customized format. Further, the important highlights are accurately detected by only extracting the audio of the frames immediately after the shots and selecting the shots based on the level of that audio. In other words, the audio during the shots of the selected segment of the data stream is disregarded. This eliminates any errors in the audio readings that may be caused by unwanted noise such as the commentator's voice or sounds made by the players. Further, by extracting the audio after the shots and selecting shots based on the level of that audio, the natural delay in the audience response to important events is captured. This method is particularly effective when used in relation to tennis, for example, as the crowd is forbidden to make noise during the game play and can only react after each point has been played, i.e. after each rally.

The step of detecting a plurality of shots of an audio/visual data stream may comprise the steps of: comparing visual properties of each frame of the data stream with visual properties of a respective subsequent frame of the data stream; and detecting a plurality of shots, each shot comprising a plurality of consecutive frames for which compared visual properties are similar. This provides an effective way of determining the shots that are focussing on the same event by analysing the change in the visual properties of consecutive frames, for example, when the visual properties of the frames change from a long-field view shot to a short field view shot. The frames that contain similar visual properties are likely to be of the same view shot and can therefore easily be determined. In this way, the transitions between shots are identified thus providing a simple, yet effective way of detecting the different shots in the data stream.

The step of determining a plurality of segments of an audio/visual data stream may comprise the steps of: comparing visual properties of each shot of the data stream; and determining a plurality of segments comprising a plurality of the shots for which compared visual properties are similar. As a result, the shots containing similar visual properties define the segments. This enables certain events to be determined as highlights. For example, when an important event is present in the data stream, the shots that include the important event are likely to include the same visual properties since the important event will be covered by a plurality of visually similar shots. For example, in a tennis match, the important event may be a rally and the visual features of the shots that include the rally are likely to be similar. When the rally is over, the visual properties are likely to change in a particular shot and so this shot is not included in the segment. This enables the important events of a data stream to be determined in a simple but effective way.

The visual properties may comprise at least one of dominant colour, colour structure, colour layout, colour hue histogram, luma histogram, edge histograms, average histogram change and average pixel change. For example, a change in the histogram between two consecutive frames signifies a change in the visual properties of the frames and therefore frames that include the same event (i.e. frames that have the same visual properties) can easily be determined.

The step of selecting a segment of the determined plurality of segments comprises the step of: selecting the longest segment of the determined plurality of segments. As a result, the most interesting segment, e.g. the one containing all tennis rallies, can be distinguished from the less interesting segments.

The visual properties may also include the content of each of the plurality of consecutive frames and the method may further comprise the step of: detecting and analysing the content of each of the plurality of consecutive frames. This allows a more refined determination of the interesting frames. For example, the court lines present in the frames may be detected and analysed to enable a more accurate determination of important segments. Alternatively, the motion of the ball may be detected and analysed to extract the most interesting segments.

According to one embodiment, the step of extracting the audio in a plurality of consecutive frames which occur after the end of the shot comprises the step of: for each shot of the selected segment of the data stream, calculating the audio power of a plurality of consecutive frames which occur after the end of the shot for a predefined frequency band; and the step of selecting at least one of the shots based on the extracted audio comprises the step of: selecting at least one of the shots, wherein the audio power of the plurality of consecutive frames which occur after the end of the shot for the predefined frequency band exceeds a threshold.

The predefined frequency band may be predefined as the whole of the frequency spectrum or as a part of the frequency spectrum.

As a result of frequency filtering the extracted audio in this way, the influence of the different types of audio in the audio/visual data stream is better analysed. For example, low frequency bands convey the general audio power, bands with slightly higher frequencies typically convey information about the human voice (for example, the voice of the commentator) and bands with even higher frequencies convey information regarding the general noise made by audience.

According to an alternative embodiment, the step of extracting the audio in a plurality of consecutive frames which occur after the end of the shot comprises the steps of: calculating a first moving average of audio power of the data stream over a first predetermined length of the data stream; calculating a second moving average of audio power of the data stream over a second predetermined length of the data stream; wherein the first predetermined length of the data stream is different from the second predetermined length of the data stream; and comparing the first and second moving averages.

The step of selecting at least one of the shots may comprise the step of: selecting each shot in which the difference between the first average and the second average exceeds a threshold.

In this way, the highlight detection algorithm is more independent of the characteristics of the broadcast, event, audience, commentator etc. For example, the audio power for each frequency band (or alternatively for the entire audio spectrum) is typically computed over a running window that analyses a group of audio frames lasting for a certain duration of time. However, the audio power is often dependent of the characteristics of the broadcast, event, audience, commentator, etc. For example, if the stadium is full, the overall audio level or power will be much higher than if the stadium is half full but this does not necessarily mean that the match is less interesting. The second averaging window normalises the audio so that the highlight detection algorithm is more independent of such characteristics.

The threshold may be a predetermined threshold.

The data stream may be representative of a racquet sport and the determined plurality of segments may correspond to a rally. In this way, the user might record a tennis match, for example, on his personal video recorder. The device is then able to present the most interesting rallies and skip those that did not get audience attention and therefore might be considered as of no high interest. Further, the technology can provide navigation through individual rallies and skip commercials and breaks between rallies or provide points of the actual game and skip beginning and end of the recording that does not belong to the actual tennis match.

BRIEF DESCRIPTION OF DRAWINGS

For a more complete understanding of the present invention, reference is now made to the following description taken in conjunction with the accompanying drawings in which.

DETAILED DESCRIPTION OF EMBODIMENTS OF THE INVENTION

Figure 1:
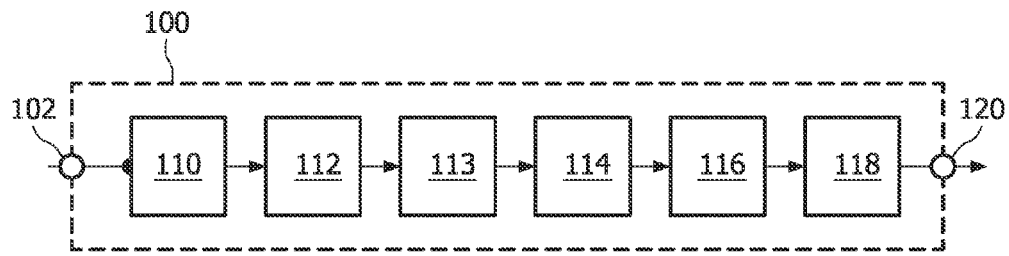
FIG. 1 is a simplified schematic of apparatus for generating a summary of an audio/visual data stream.

With reference to FIG. 1, the apparatus 100 comprises an input terminal 102 for input of an audio/visual data stream into a shot detector 110. The output of the shot detector 110 is connected to a determining means 112. The output of the determining means 112 is connected to the input of a first selector 113. The output of the first selector 113 is connected to the input of an extractor 114. The output of the extractor 114 is connected to the input of a second selector 116. The output of the second selector 116 is connected to the input of a summary generator 118. The summary generator 118 outputs a summary via an output terminal 120 to a display such as a television or other display means.

Figure 2:
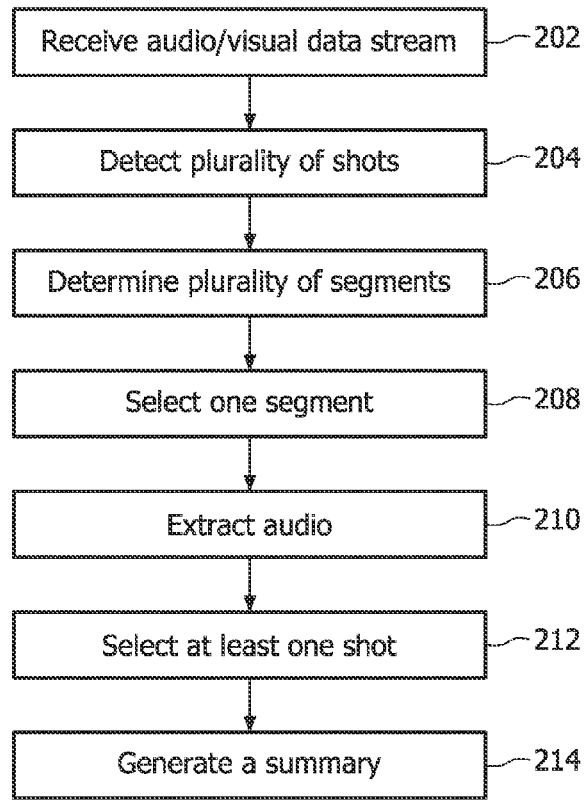
FIG. 2 is a flowchart of a method of generating a summary of an audio/visual data stream.

Operation of the apparatus of FIG. 1 will now be described in detail with reference to FIG. 2. An audio/visual data stream is received on the input terminal 102 (step 202) and is input into the shot detector 110. The audio/visual data stream comprises a plurality of consecutive frames having audio and visual properties. The audio/visual data stream may be available, either on local storage, received from a broadcast channel, or downloaded from the internet and may, for example, be representative of a racquet sport such as a tennis, badminton, squash, table tennis etc.

The shot detector 110 detects a plurality of shots of the audio/visual data stream (step 204). This is achieved by the shot detector 110 comparing the visual properties of each frame of the audio/visual data stream with the visual properties of a relative subsequent frame of the data stream and determining a plurality of shots comprising a plurality of consecutive frames for which compared visual properties are similar. In other words, the shot detector 110 uses the visual properties of the frames to detect sudden changes in the visual properties of consecutive frames. The sudden changes in the visual properties may be, for example, sudden changes in the sets of histogram of the original colour spaces such as sudden changes in the original YCbCr colour space (the family of color spaces used in video systems, where Y is the luminance component and Cb and Cr are the blue and red chrominance components). The sudden changes in the visual properties correspond to transitions between shots in the data stream.

The shot detector 110 outputs the detected plurality of shots of the audio/visual data stream to the determining means 112.

The determining means 112 determines a plurality of segments of the audio/visual data stream, each segment comprising a plurality of the shots of the data stream having similar visual properties (step 206), the plurality of the shots not necessarily all being consecutive. In other words, the determining means 112 clusters together visually similar shots to form a segment. For example, the determining means 112 clusters together two shots of the data stream if the difference between the visual properties of the two shots is below a predetermined value to form a segment.

The visual properties are, for example, at least one of dominant colour, colour structure, colour layout, colour hue histogram, luma histogram, edge histograms, average histogram change and average pixel change. The visual properties may also include the content of each of the shots and the determining means 112 may detect and analyse the content of each of the plurality of shots. The content, for example, includes court lines detected in the frames, tennis ball drops detected in the frames, faces detected in the frames or any other content.

The determining means 112 outputs the determined plurality of segments to the first selector 113.

The first selector 113 selects one segment of the determined plurality of segments (step 208). For example, the first selector 113 selects the longest segment of the determined plurality of segments. In this way, the first selector 113 selects the biggest cluster of similar shots. In some instances, the longest segment may indicate one of more interest or one which is more eventful. In the case of the data stream being representative of a racquet sport, the selected segment may, for example, correspond to rallies since the shots that correspond to rallies are visually very similar and are also the most frequently occurring shots in the broadcast of a racquet sport.

The first selecting means 113 outputs the selected segment to the extractor 114.

The extractor 114 extracts, for each shot of the selected segment of the data stream, the audio in a plurality of consecutive frames which occur after the end of the shot (step 210). The extractor 114 disregards the audio during the shots. In other words, the extractor 114 extracts the audio power features in the intervals between the shots of the selected segment. By extracting the audio in a plurality of consecutive frames which occur after the end of the shots, the extractor 114 only extracts the audio between the start and the extended end of each interval. This captures, for example, the natural delay in the audience response.

In one embodiment, the extractor 114 extracts the audio by calculating, for each shot of the selected segment of the data stream, the audio power of a plurality of consecutive frames which occur after the end of the shot for a predefined frequency band. The predefined frequency band may be predefined as a certain part of the frequency spectrum (for example, a frequency band of 1 to 5 kHz). In this case, the extractor 114 only calculates the audio in the plurality of consecutive frames which occur after the end of the shot for that part of the frequency spectrum. By frequency filtering the extracted audio in this way, the influence of the different types of audio in the audio/visual data stream is better analysed. For example, low frequency bands convey the general audio power, bands with slightly higher frequencies typically convey information about the human voice (for example, the voice of the commentator) and bands with even higher frequencies convey information regarding the general noise made by audience. Alternatively, the frequency band may be predefined as the whole of the frequency spectrum (i.e. all frequencies). In this case, the extractor 114 calculates the audio in the plurality of consecutive frames which occur after the end of the shot for the whole of the frequency spectrum (i.e. for all frequencies). This calculated audio is the global audio power.

The extractor 114 outputs the extracted audio to the second selector 116.

The second selector 116 selects at least one of the shots based on the extracted audio (step 212). For example, the second selector 116 selects at least one of the shots, wherein the audio power of the plurality of consecutive frames which occur after the end of the at least one of the shots for the predefined frequency band exceeds a threshold.

In this way, the shots that provoked a more intense response are determined. These shots are most likely to be more interesting to the audience or the commentator. The threshold may be predetermined and can be set by the user or adjusted automatically in response to a user's response to a level as desired to include more or less interesting highlights.

In an alternative embodiment, the extractor 114 extracts the audio by calculating two moving averages of audio power over two different lengths of the data stream. In other words, the extractor 114 calculates a first moving average of audio power of the data stream over a first predetermined length of the data stream and calculates a second moving average of audio power of the data stream over a second predetermined length of the data stream. The first predetermined length of the data stream is different from the second predetermined length of the data stream. For example, the extractor 114 calculates a first moving average for a short window of the data stream (e.g. 1 second) and a second moving average for a long window of the data stream (e.g. 20 seconds). The second averaging window is typically larger than the first one (usually by an order of 10) and captures the "global" characteristics of the audio. The extractor 114 therefore processes the audio power features in selected intervals of the data stream in order to classify, for example, the response of an audience to events at the court of a tennis match. The extractor 114 then compares the first and second moving averages.

The extractor 114 outputs the compared first and second moving averages of the audio power for each shot to the second selector 116.

The second selector 116 selects each shot in which the difference between the first running average and the second running average exceeds a threshold. In other words, by comparing the audio power computed for the first window with the audio power computed for the second window, the selector 116 detects any sudden rise of audio power above the general characteristics. Where the difference between the first running average and the second running average exceeds a threshold, the response of the audience is considered as one reflecting a highlight. Again, the threshold may be predetermined and can be set by the user or adjusted automatically in response to a user's response to a level as desired to include more or less interesting highlights.

The second selector 116 outputs the selected at least one of the shots into the summary generator 118. The summary generator 118 generates a summary to include the selected at least one of the shots (step 214) and outputs the summary via the output terminal 120 for display by, for example a television or any other display means.

Although embodiments of the present invention have been illustrated in the accompanying drawings and described in the foregoing detailed description, it will be understood that the invention is not limited to the embodiments disclosed, but is capable of numerous modifications without departing from the scope of the invention as set out in the following claims.

'Means', as will be apparent to a person skilled in the art, are meant to include any hardware (such as separate or integrated circuits or electronic elements) or software (such as programs or parts of programs) which reproduce in operation or are designed to reproduce a specified function, be it solely or in conjunction with other functions, be it in isolation or in co-operation with other elements. The invention can be implemented by means of hardware comprising several distinct elements, and by means of a suitably programmed computer. In the apparatus claim enumerating several means, several of these means can be embodied by one and the same item of hardware. 'Computer program product' is to be understood to mean any software product stored on a computer-readable medium, such as a floppy disk, downloadable via a network, such as the Internet, or marketable in any other manner.

The invention claimed is:

1. A method of generating a summary of an audio/visual data stream, said data stream comprising a plurality of consecutive frames having audio and visual properties, the method comprising:
   detecting, by a shot detector, a plurality of shots of the audio/visual data stream, wherein each shot comprises a plurality of consecutive frames of said data stream that focus on a same view shot;
   determining, by a determining means, a plurality of segments of said data stream, wherein each segment comprises a plurality of shots of the detected plurality of shots of said data stream having similar visual properties;
   selecting, by a first selector, a segment of said determined plurality of segments;
   for each respective shot of said selected segment of said data stream, extracting, by an extractor, audio of a plurality of consecutive frames of said data stream which occur after an end of said respective shot, wherein said extracting the audio comprises calculating an audio power of the plurality of consecutive frames of said data stream which occur after the end of said respective shot for a predefined part of an audio frequency spectrum;
   selecting, by a second detector, at least one of said shots of said selected segment based on the extracted audio; and
   generating, by a summary generator, a summary to include said selected at least one of said shots.

2. The method according to dam 1, wherein the selecting at least one of said shots based on the extracted audio comprises:
   selecting at least one of said shots, wherein the extracted audio in a plurality of consecutive frames which occur after the end of said at least one of said shots exceeds a predetermined threshold.

3. The method according to claim 1, wherein the detecting a plurality of shots of an audio/visual data stream comprises:
   comparing visual properties of each frame of said data stream with visual properties of a respective subsequent frame of said data stream; and
   detecting a plurality of shots, wherein each shot comprises a plurality of consecutive frames for which compared visual properties are similar.

4. The method according to claim 1, wherein the determining a plurality of segments of an audio/visual data stream comprises:
   comparing visual properties of each shot of said data stream; and
   determining the plurality of segments, wherein each segment comprises a plurality of shots for which compared visual properties are similar.

5. The method according to claim 1, wherein the selecting a segment of said determined plurality of segments comprises:
   selecting a longest segment of said determined plurality of segments.

6. The method according to claim 1, wherein the visual properties include a content of each of said shots, the method further comprising:
   detecting and analysing the content of each of said shots.

7. The method according to claim 1,
   wherein the selecting at least one of said shots based on the extracted audio further comprises:
   selecting at least one of said shots, wherein the audio power of said plurality of consecutive frames which occur after the end of said shot in said predefined part of the audio frequency spectrum exceeds a threshold.

8. The method according to claim 1, wherein the extracting the audio in a plurality of consecutive frames which occur after the end of said shot comprises:
   calculating a first moving average of audio power of said data stream over a first predetermined length of said data stream;
   calculating a second moving average of audio power of said data stream over a second predetermined length of said data stream;
   wherein said first predetermined length of said data stream is different from said second predetermined length of said data stream; and
   comparing said first and second moving averages.

9. The method according to claim 8, wherein the selecting at least one of said shots comprises:
   selecting each shot in which a difference between said first moving average and said second moving average exceeds a threshold.

10. The method according to claim 1, wherein said data stream is representative of a racquet sport and said selected segment corresponds to rallies.

11. A computer program product embedded in a non-transitory medium comprising a plurality of program code portions for carrying out the method according to claim 1.

12. Apparatus for generating a summary of an audio/visual data stream, said data stream comprising a plurality of consecutive frames having audio and visual properties, the apparatus comprising:

a shot detector for detecting a plurality of shots of the audio/visual data stream, wherein each shot comprises a plurality of consecutive frames of said date stream that focus on a same view shot;

a determining means for determining a plurality of segments of said data stream, wherein each segment comprises a plurality of shots of the detected plurality of shots of said data stream having similar visual properties;

a first selector for selecting a segment of said determined plurality of segments;

an extractor for extracting, for each respective shot of said selected segment of said data stream, audio of a plurality of consecutive frames of said data stream which occur after an end of said respective shot;

a second selector for selecting at least one of said shots of said selected segment based on the extracted audio; and a summary generator for generating a summary to include said selected at least one of said shots, wherein said extracting the audio comprises calculating an audio power of the audio in the plurality of consecutive frames of said data stream which occur after the end of said respective shot for a predefined part of an audio frequency spectrum.

* * * * *